(12) United States Patent
Apparao et al.

(10) Patent No.: US 8,683,547 B2
(45) Date of Patent: Mar. 25, 2014

(54) SYSTEM AND METHOD FOR IMPLEMENTING ADAPTIVE SECURITY ZONES

(75) Inventors: Vidur Apparao, San Mateo, CA (US);
Niall Browne, Redwood City, CA (US);
Scott Bailey, Scotts Valley, CA (US);
Jeremy King, San Jose, CA (US)

(73) Assignee: LiveOps, Inc., Redwood City, CA (US)

(*) Notice: Subject to any disclaimer, the term of this patent is extended or adjusted under 35 U.S.C. 154(b) by 398 days.

(21) Appl. No.: 12/589,832

(22) Filed: Oct. 28, 2009

(65) Prior Publication Data
US 2011/0099602 A1    Apr. 28, 2011

(51) Int. Cl.
*H04L 29/06* (2006.01)
*G06Q 30/00* (2012.01)
*G06Q 30/02* (2012.01)

(52) U.S. Cl.
CPC .............. *H04L 63/20* (2013.01); *H04L 63/105* (2013.01); *H04L 63/108* (2013.01); *H04L 2463/102* (2013.01); *H04L 29/06986* (2013.01); *H04L 29/0685* (2013.01); *G06Q 30/016* (2013.01); *G06Q 30/0281* (2013.01)
USPC .............. 726/1; 726/2; 726/3; 726/4; 726/16; 726/17; 726/21; 726/26; 726/27; 726/28; 726/30; 713/166; 713/187; 713/188; 705/304; 705/345; 705/346; 709/223; 709/224; 709/228

(58) Field of Classification Search
CPC ..... H04L 63/10; H04L 63/101; H04L 63/105; H04L 63/107; H04L 63/108; H04L 63/20; H04L 63/30; H04L 63/304; H04L 63/306; H04L 2463/102; H04L 29/06986; H04L 29/06823; H04L 29/06829

USPC ................... 726/1–21, 26–30; 713/182–186; 713/164–166; 705/304, 345, 346; 709/217–229
See application file for complete search history.

(56) References Cited

U.S. PATENT DOCUMENTS

| | | | |
|---|---|---|---|
| 6,047,262 A * | 4/2000 | Lutz ................................ | 705/16 |
| 6,862,343 B1 | 3/2005 | Vacek et al. | |
| 7,426,268 B2 | 9/2008 | Walker et al. | |
| 7,512,983 B2 * | 3/2009 | Saffre ............................. | 726/25 |
| 7,725,943 B2 * | 5/2010 | Shannon et al. ................ | 726/26 |
| 2002/0038286 A1 | 3/2002 | Koren et al. | |

(Continued)

OTHER PUBLICATIONS

Threat-Adaptive Security Policy by Venkatesan et al; Publisher: IEEE; Year 1997.*

(Continued)

*Primary Examiner* — Madhuri Herzog
(74) *Attorney, Agent, or Firm* — Duane Morris LLP; David T. Xue

(57) ABSTRACT

A system for managing adaptive security zones in complex business operations, comprising a rules engine adapted to receive events from a plurality of event sources and a security manager coupled to the rules engine via a data network, wherein upon receiving an event, the rules engine determines what rules, if any, are triggered by the event and, upon triggering a rule, the rules engine determines if the rule pertains to security and, if so, sends a notification message to the security manager informing it of the triggered event, and wherein the security manager, on receiving a notification message from the rules engine, automatically establishes a new security zone based at least in part on the contents of the notification message, is disclosed.

16 Claims, 12 Drawing Sheets

(56) References Cited

U.S. PATENT DOCUMENTS

| | | | |
|---|---|---|---|
| 2003/0177389 A1* | 9/2003 | Albert et al. | 713/201 |
| 2004/0123150 A1* | 6/2004 | Wright et al. | 713/201 |
| 2004/0234056 A1* | 11/2004 | Heilmann et al. | 379/196 |
| 2006/0090200 A1* | 4/2006 | Oie | 726/7 |
| 2006/0242695 A1 | 10/2006 | Nedeltchev et al. | |
| 2006/0282896 A1* | 12/2006 | Qi | 726/25 |
| 2007/0035390 A1* | 2/2007 | Thomas et al. | 340/539.11 |
| 2008/0037719 A1* | 2/2008 | Doren | 379/85 |
| 2009/0106826 A1* | 4/2009 | Palestrant | 726/7 |
| 2011/0131324 A1* | 6/2011 | Chaturvedi et al. | 709/225 |

OTHER PUBLICATIONS

An Adaptive Security Model for Mobile Agents in Wireless Networks by Alampalayam et al; Publisher: IEEE; Year: 2003.*

U.S. Appl. No. 10/963,236, filed Apr. 1, 2009, Everingham et al., Office Action.
U.S. Appl. No. 10/963,236, filed Dec. 9, 2009, Everingham et al., Office Action.
U.S. Appl. No. 10/963,236, filed Jun. 23, 2010, Everingham et al., Office Action.
U.S. Appl. No. 10/963,236, filed Feb. 7, 2011, Everingham et al., Office Action.
U.S. Appl. No. 10/963,236, filed Jul. 19, 2011, Everingham et al., Office Action.
U.S. Appl. No. 10/963,236, filed Jan. 25, 2012, Everingham et al., Office Action.
U.S. Appl. No. 10/963,236, filed Jun. 25, 2012, Everingham et al., Notice of Allowance.

* cited by examiner

SYSTEM AND METHOD FOR IMPLEMENTING ADAPTIVE SECURITY ZONES

CROSS-REFERENCE TO RELATED APPLICATIONS

None.

BACKGROUND OF THE INVENTION

1. Field of the Invention

The present invention is in the field of information security, and more particularly it is in the field of security systems for use in complex business processes such as contact centers and other customer service applications.

2. Discussion of the State of the Art

When the contact center industry first arose some forty years ago, security was a relatively straightforward matter. The technologies in use were analog telephones and text-based computer terminals for the most part, and all of the customer service representatives who might interact with customers (and thus be exposed to sensitive customer data) were generally employees and were centrally located in secure facilities. Data was generally stored in very secure mainframe computers. In this early contact center industry context, the primary security threat to consumer data would have been the employees, and this threat was not serious. The employees did not have access to computers at home, nor to the Internet, and there were no small, easily-concealed devices capable of storing large amounts of data. And since employees' only contact with computers was likely to be with the remote terminals in the contact center where they worked, the level of sophistication in computer technology of the employees was generally low (so the risk of customer service representatives' "hacking in" to the mainframe to steal consumer data was minimal and easily mitigated). And, a much smaller proportion of consumers' economic activity was conducted using credit cards in the early days of the contact center business, compared to today. Online banking was unheard of forty or even twenty years ago. In short, there was less data to steal, and it had less value, and it was harder to steal.

Today's customer service contact center environment offers a stark contrast, in terms of securing sensitive data, to this simple situation of years gone by. Today, virtually every customer service representative (or "agent"; throughout this document the term "agent" will be used to refer to customer service representatives generally) will have computers at home, and will be computer literate. Agent turnover tends to be high, and many agents are very technically savvy, as they have grown up with computers, unlike the agents of the early days in the contact center industry. Readily-available technologies that make it possible to record and conceal large amounts of data, such as flash memory sticks and the like, make it easy for technically knowledgeable agents to gather data and remove it from secured facilities with ease. Because most transactions conducted by consumers involve credit cards, debit cards, online banking, ecommerce, or some combination of these, essentially all consumer economic activity creates exploitable and accessible sensitive data. And, since the telephony systems used by contact centers tend to be tightly integrated to the computer systems, since sensitive data is often stored on many servers, and since agents work with fully-functional computers rather than terminals in most contact centers today, whatever data passes through a contact center tends to be much more accessible to agents than ever before.

To complicate this already much more severe situation, the related trends of outsourcing of contact center operations including agents, offshoring of technology and people, and utilizing home-based agents means that much of the technology and many of the people involved in delivering customer service from large enterprises to consumers is potentially not even under the control of the enterprise. Enterprises must rely on security programs of their partners, and these programs must deal with the difficulty that more than one of their enterprise clients' data is moving through their contact centers. This last detail adds a new dimension, because now it is important not only to make sure agents or hackers do not steal sensitive data, but also to ensure that data of different clients is not comingled. These challenges are exacerbated yet more by the rapid emergence of "cloud computing" platforms in which large server farms making extensive use of machine virtualization technology operate complex applications on behalf of (and usually under the control of) numerous independent clients, many of whom compete with each other.

In some cases, home agents are used to conduct customer service operations. Often these home agents are employees of the enterprise providing the customer service. In other cases, they may be employees of an outsourcer that provides contact center services on behalf of an enterprise. And in yet other cases, home agents may be independent contractors, making money by working part time as contact center agents from home. As with the outsourcing arrangement, these home agents may provide services to more than one enterprise, making the data comingling challenge relevant. The computers used by home agents are sometimes owned by the agents' employers, but in the case of independent contractor home agents, the computer is owned by the agent and is not under the direct control of any enterprise's information security tools, programs, or policies. Clearly the challenge of ensuring the security of sensitive consumer data in this environment is much more complex and daunting than the security challenges faced by early contact centers.

Finally, when dealing with home agents, and especially those who work casually or part time, there is a new privacy issue raised that is simply not present in centralized contact centers (whether an enterprise's own centers or those of an outsourcer). The privacy of the home agent also needs to be protected, at least when the agent is not working on behalf of an enterprise. That is, it is fine for an enterprise to monitor calls to a home agent that are taken on behalf of that enterprise, and for the same enterprise to monitor keystrokes of the agent during these calls (and any wrap-up work following these calls). But it would be inappropriate for the same enterprises to monitor calls that are either for another enterprise or not part of the agent's work at all (in many cases, the same phone is used for personal calls and contracted customer service calls). Currently available systems provide an all or nothing approach, for example by having a dedicated phone line only for business use (difficult to enforce), or running business calls through an intermediate point under the control of the enterprise and only monitoring calls passing through that intermediate point (effectively thereby only monitoring business calls; however, this approach still does not solve the problem of comingling when more than one enterprise uses the same outsourcer and the intermediate point is under the control of the outsourcer).

Another, related problem faced by enterprises in the art today is the control of tools and capabilities needed by agents to perform customer service functions. Agents not only have access to important consumer data, but also to the enterprise's own proprietary data and systems. For instance, in a common scenario, home-based agents working part time take direct response calls from consumers who have viewed, for example, a television infomercial and wish to consider buying the advertised product. The home agent typically must have access to pricing information and to transactional systems in order to carry out the desired sale. Pricing data, and data about promotions that are in place or that are upcoming, is very sensitive, and it is desirable that home agents only have access to that data as they need it, with no ability to copy it. And in some cases enterprises may want to ensure that certain tools used by agents are only available for valid business reasons, rather than for personal reasons. For example, in a ticket-selling scenario, it might be important that the agent is only allowed to sell tickets to valid customers calling in and pre-screened by an interactive voice response (IVR) system; it would be important in these cases to prevent the agent from selling tickets to family and friends while they have access to the tools. Again, the emergence of cloud computing complicates an already challenging situation, because the tools provided for use in service of various clients may themselves be cloud-based, "hosted" applications operated by independent third parties.

Another problem common in the art, and made worse by the widespread adoption of home or remote workers, is the problem of safeguarding sensitive customer data that is stored in call recordings or other recordings of activity such as application steps taken during customer interactions. These recordings are commonly used in the art for quality monitoring and training purposes. Increasingly, quality-monitoring personnel may also be home-working independent contractors. And training is often performed online, especially when training home agents. In these situations, call recordings (and related recorded data) may be viewed by people who are not under the direct control of the enterprise, and who may be using computers not under the control of the enterprise's information security programs and policies. While it may be desirable to manually edit such recordings to remove sensitive data such as credit card and social security numbers, this approach has at least two serious problems. First, the cost and limited scalability of such manual methods makes them unattractive for most applications. Second, in many cases it is legally or contractually necessary to retain a complete recording of every call. Complete recordings may be needed for evidentiary purposes, dispute resolution, employee disciplinary actions, or legal records of authentication or transactions (in health care and securities industry, for example).

It is an object of the present invention to provide a more effective security management system for complex business processes by addressing many of the problems just described.

SUMMARY OF THE INVENTION

In a preferred embodiment of the invention, a system for managing adaptive security zones in complex business operations, comprising a rules engine adapted to receive events from a plurality of event sources and a security manager coupled to the rules engine via a data network, is disclosed. According to the embodiment, upon receiving an event, the rules engine determines what rules, if any, are triggered by the event and, upon triggering a rule, the rules engine determines if the rule pertains to security and, if so, sends a notification message to the security manager informing it of the triggered event, and the security manager, on receiving a notification message from the rules engine, automatically establishes a new security zone based at least in part on the contents of the notification message.

In another embodiment of the invention, at least one of the event sources is a communications system or device. In yet another embodiment of the invention, at least one of the event sources is a call manager. In some embodiments of the invention, the security zone extends to at least one remote independent agent, and optionally precludes the use of at least one software tool or program that is otherwise available to the remote independent agent or requires at least an additional authentication step before the remote independent agent is allowed to take a specific action. In another embodiment of the invention, the security zone causes sensitive information to be automatically made inaccessible within a call recording.

In another preferred embodiment of the invention, a system for managing adaptive security zones in customer service operations involving remote independent customer service agents, comprising a call manager server adapted at least to receive and control telephony sessions, a rules engine adapted to receive events from at least the call manager, and a security manager coupled to the rules engine via a data network, is disclosed. According to the embodiment, upon receiving an event, the rules engine determines what rules, if any, are triggered by the event and, upon triggering a rule, the rules engine determines if the rule pertains to security and, if so, sends a notification message to the security manager informing it of the triggered event, and the security manager, on receiving a notification message from the rules engine, automatically establishes a new security zone based at least in part on the contents of the notification message.

In another preferred embodiment of the invention, a method for adaptively managing security zones in complex business operations, comprising the steps of (a) receiving an event pertaining to the business operation, (b) determining if any rules are triggered by the received event, (c) determining if any triggered rules pertain to security, and (d) establishing a new security zone based at least in part on the identity and contents of a triggered security-related rule.

BRIEF DESCRIPTION OF THE DRAWING FIGURES

DETAILED DESCRIPTION

Figure 1:
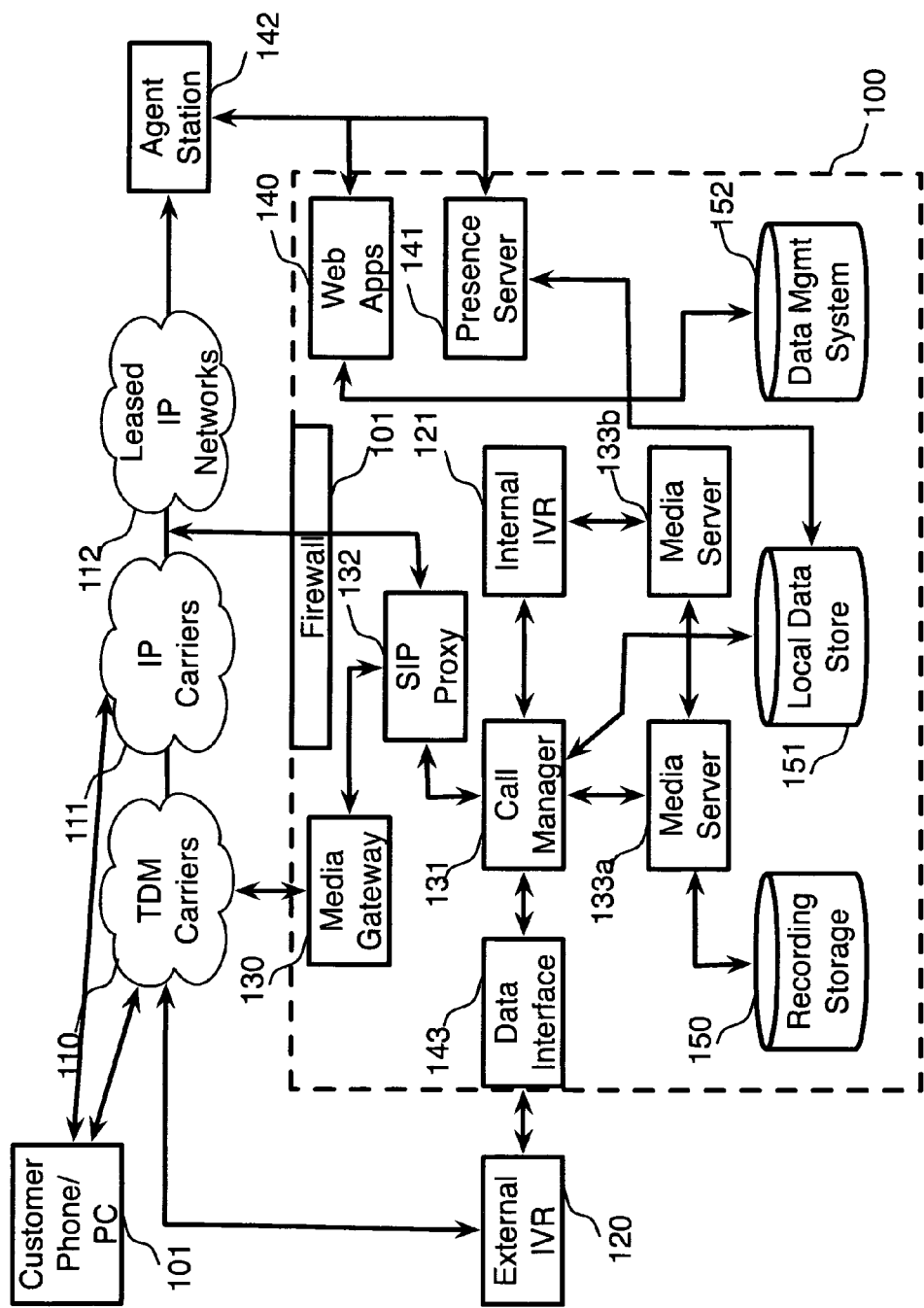
FIG. 1 (Prior Art) is a block diagram of a complex customer service delivery platform known in the art.

The inventors provide, in a preferred embodiment of the invention, a system and methods for implementing adaptive security zones. A "security zone" is a region, in space or time (or both), in which a specified set of security rules are implemented or enforced. Regions can be defined in space by reference to organizational structures or their associated infrastructure elements, such as "all desktops operated by home agents" or "all servers within a given site", or even, "those portions of an agent's desktop video display that are under the control of applications managed by our company", and the like. Regions can also be defined in space by reference to data elements or media streams stored or operating at particular locations in an electronic computer or on a particular data or telecommunications network, for example "the audio streams for all call legs originating from an agent's phone", or "all call recordings stored in a particular vaulted storage facility". Regions can be defined in time by reference any specific physical time period, but also by reference to any particular set of steps in a process; for example, the phrase "from the time an agent logs in, until the agent takes her first call" defines a specific region in time during which a particular set of security rules may be placed in effect. It is clearly expected that security zones as referred to herein refer only to those systems or participants that are under the direct physical or policy-based control of a particular system or entity, or a particular set of systems or entities, that implement a particular set of security rules, and the scope of the invention only extends to those systems or persons so situated. An "adaptive security zone" is a security zone, as defined above, in which a set of security rules that is implemented or enforced depends in some predictable way on one or more business rules and in which security rules are added or dropped as additional business rules are satisfied, or as previously satisfied business rules become ineffective (that is, they are no longer satisfied). "Business rule" as used herein means a rule triggered by a specific event or range of events (events being, for example, changes in data, completion of a step in a process, or even simply the arrival of a specified time). Business rules are commonly executed in a rules engine, where each time an event is "fired" (or occurs), a check is made to see what rules are required to be evaluated based on the identity or attributes of the event. For example, "when a new account is opened, check if the opening balance is greater than $5,000 and, if so, send a gift to the address of the account" is a rule that specifies an action (send a gift) to take on receipt of an event (new account opened) that satisfies certain conditions (minimum account balance of $5,000). While the terms "business rule" and "rules engine" are well-known in the art, it should be appreciated that it is not important, for the purposes of defining the scope of the present invention, that a business rule actually be relevant to a for-profit business or indeed any business at all. And while there are many standard types of rules engines in the art, it should also be appreciated that any software running on a computing device, or firmware, or programmable hardware device that receives events, evaluates them against a set of rules based on each event's type or attributes, and then causes those rules whose criteria are satisfied to be carried out, can be considered a "rules engine" for the purposes of defining the scope of this invention.

In a preferred embodiment of the invention, adaptive security zones are used to manage operations of complex customer service processes. FIG. 1 shows a typical arrangement of a customer service platform capable of carrying out complex business processes, and known in the art. In the example shown in FIG. 1, customer service is provided by agents working at agent stations 142 that are outside of the organizational (or legal) boundaries of an enterprise 100. For example, agents can be independent contractors interacting with customers via their agent station 142, which comprises in one exemplary arrangement a personal computer and a telephone located at the agent's home. Note that agent station 142 can also comprise only a computer, with software operable on the computer to enable Internet Protocol (IP) telephony to be carried out from the computer, typically with a headset used by the agent for both microphone and audio playback purposes. Any form of agent station 142 that allows data communication to servers within enterprise 100, over the Internet or otherwise, and allows live communication with customers seeking service, can be used.

Customers seek service (or may be proactively approached to provide service; service need not be "inbound" from customer to service provider, but can be "outbound" as well, within the scope of the invention) from a phone or PC 101, typically by calling an 800 number. Their phone call (and possibly also their data connection, via the Internet) is carried over either time-division multiplexed telephone carriers 110 (that is, what is commonly known as "plain old telephone service") or over Internet Protocol (IP) carriers 111 such as are well-established in the marketplace today. In some embodiments, calls are extended from a phone network (TDM carrier 110 or IP carrier 111, or via a leased IP network 112) to an external interactive voice response (IVR) system 120, where callers can traverse menus and possibly engage in self-service transactions. External IVR service providers are well-known in the art. Data collected in external IVR system 120 can be passed to applications within enterprise 100 via data interface 143, which can implement any of the many data interface mechanisms known in the art, such as web services, Java with remote procedure calls (RPC), direct application programming interface (API) calls against a public or proprietary interface specification provided to the operator of external IVR system 120 by enterprise 100, and the like. In other embodiments, calls are extended into the enterprise 100 from TDM carrier 110 via media gateway 130, where the TDM call is converted to an IP call, using for example the Session Initiation Protocol (SIP). Calls may be extended into enterprise 100 without first going to external IVR 120, or they may first go to external IVR 120 and then be extended into the enterprise 100 via TDM carrier 110. Alternatively, calls may be extended into the enterprise 100 from an IP carrier (public IP carrier 111 or leased IP network 112). Alternatively, calls may be delivered directly from external IVR system 120 to agent station 142, usually but not necessarily as a result of data passed to external IVR system 120 from data interface 143 (data passed is often, for example, call routing instructions telling external IVR system 120 to which among potentially many agent stations to route the call).

In the prior art example shown in FIG. 1, calls are converted to IP (typically but not necessarily using SIP) either in an external IP network (111 or 112) or in media gateway 130. Call control is executed in Call Manager 131, which receives messages from SIP Proxy 132 concerning the arrival and state of IP calls, and optionally receives data from external IVR 120 via data interface 143. Call control can include routing based on a variety of rules, commonly including first-in, first-out queues as are common in automated call distribution (ACD) systems in the art. Calls are optionally extended to one or more Media Servers 133 and possibly recorded, by storing audio data in recording storage 150. In most prior art embodiments, all calls sent to agent stations 142 would also be extended to Media Server 133a (usually via a conferenced-in call leg), so that the entire call between an agent and a customer can be recorded in Recording Storage 150. In prior art systems with external agent stations 142 (for example home agents, who are either employees of enterprise 100 or of an outsourcer, or are independent contractors), agent station 142 interacts with business applications of enterprise 100 via web services or applications 140. In some embodiments, one or more presence servers 141 are used to track agent states, particularly when routing logic in, for example, Call Manager 131 is used to route calls to specific agents.

In some embodiments, systems shown in enterprise 100 are distributed across more than one physical location, for example by distribution among a set of several data centers. Because of this, it is known in the art to have a Data Management System 152 for managing the distribution and synchronization of data among the local data stores 151 of the various sites, and for possibly interacting with third party data sources. Finally, it is well-known in the art for the various functions shown in FIG. 1 to be distributed among one or more cooperating enterprises, for example where external IVR system 120 is operated by one business entity, Media Gateway 130, SIP Proxy 132, and Call Manager 131 by another, and Web Apps 140 by possibly yet another, all integrated as needed with local data stores 151 and data management system 152 of enterprise 100. In the following descriptions of embodiments of the instant invention, it should be understood that any of the varied architectures commonly practiced in the art may be used with the invention without departing from the scope of the invention as claimed.

Figure 2:
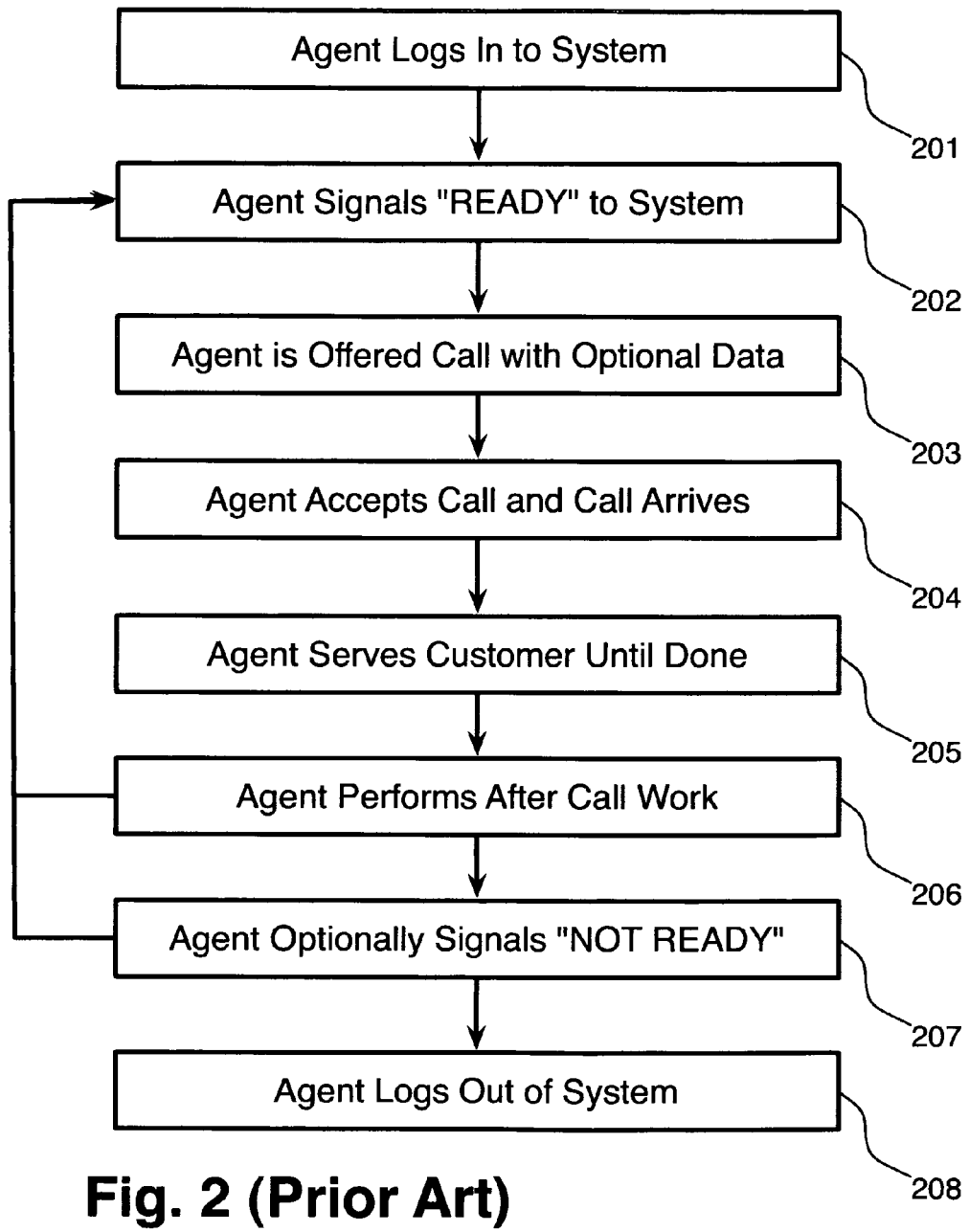
FIG. 2 (Prior Art) is a process flow diagram of agent state changes according to a complex customer service process scenario.

FIG. 2 shows a common example of state transitions that an agent working at agent station 142 may go through when participating in a distributed contact center as known in the art. When an agent is ready to work at agent station 142, he signals this readiness by logging in to the system in step 201. This is usually accomplished by an invocation of specific login API call or web services call by software executing on agent station 143 against an API or web application 140. The login function is extremely well-known in the art, and simply signals the start of a work session in which the applicable agent is connected to enterprise 100 from agent station 142. Optionally, presence server 141 is also configured to receive all state changes from agent station 142 (and others like it), and upon an agent's logging in updates its internal status indicator regarding presence of the given agent (it also receives all other state changes described below, and updates accordingly; if multiple presence servers are used for scalability, then status updates are distributed to the other presence servers when received so each presence server has a nearly identical, nearly real-time picture of the state of all agents, which is useful for routing and other purposes). This presence information stored at presence server 141 is commonly used for example in call routing, to determine which agents are currently logged in. Typically agents will not be sent calls or work from enterprise 100 until they further signal their readiness to take calls or work (usually this is referred to as "going Ready") in step 202. Once an agent is "Ready", they are available to be assigned work. In one common technique known in the art, agents are offered calls in step 203 before the calls are actually delivered to agent workstation 142 in step 204. When a call is offered, agents have a moment to review data sent via web applications 140 before deciding to accept or decline the offered call (or work; the same process can be used for offering work items, chat sessions, video sessions, and so forth—"call" is used generically herein to refer to any of the commonly routed work types in contact centers). Once an agent accepts a call or work item (step 204), the customer is served in step 205 usually until the customer hangs up or terminates the call. In many cases, an agent performs wrap-up work related to the just-completed call in step 206, and when this is done optionally signals "Not Ready" in step 207 or signals "Ready" again in step 202. In some cases in the art, agents are automatically placed in either "Ready" or "Not Ready" after completing call wrap-up work; in other cases agents are not allowed to enter the after-call work state (step 206) at all. It should be appreciated that the process sequence shown in FIG. 2 is merely intended to illustrate the kinds of state transitions that agents typically go through.

Figure 3:
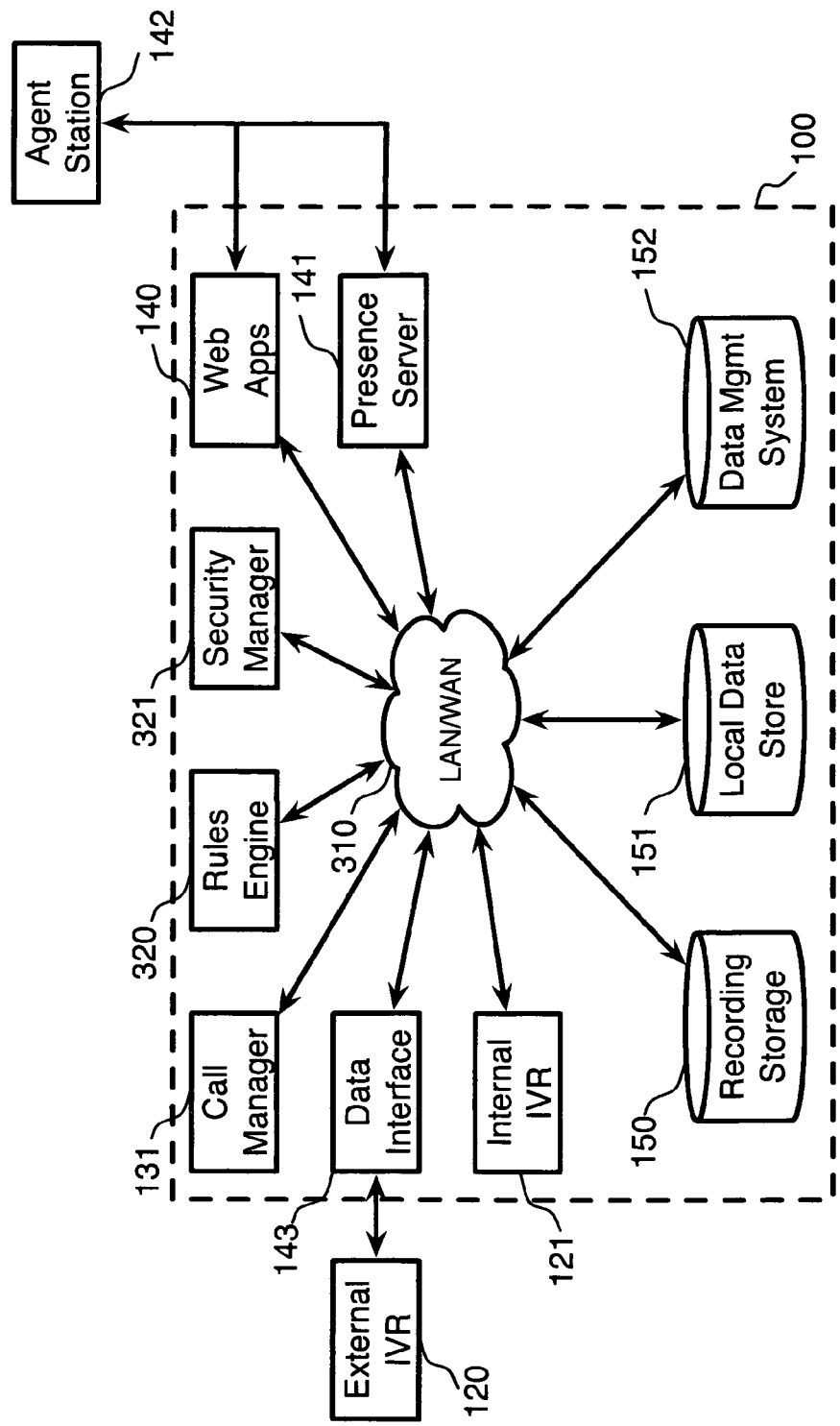
FIG. 3 is block diagram of an embodiment of the invention comprising a security manager and a rules engine.

FIG. 3 shows a preferred embodiment of the present invention, with relevant components from the exemplary architecture illustrated in FIG. 1 included for clarity. Rules engine 320 is a software component executing in memory on a digital computer and stored on a fixed local or remote data storage device for persistence. Business rules are stored in local data store 151, which in an embodiment is a relational database system operating on a dedicated database machine. It will be appreciated, however, that local data store 151 could also be collocated on a single machine with Rules Engine 320, or on a remote storage device accessed via Data Management System 152. In a preferred embodiment, Rules Engine 320 preloads all rules relevant to the enterprise 100 and the types of customer service to be provided, and retains them in local memory for speed of access during operation; alternatively, queries can be made by Rules Engine 320 to Local Data Store 151 or Data Management System 152 as needed, which is slower but reduces the vulnerability of the overall system to interruption of Rules Engine 320. In another embodiment, Rules Engine 320 can store frequently-used rules locally in memory or in a disk cache, and retrieve other rules from one of the data stores by query when appropriate. Collectively, the rules in memory and stored and accessible on either of the data stores can be referred to as the rules database for enterprise 100. Rules Engine 320 typically subscribes to receive event streams from other system components in order to check each incoming event against the rules database. Call-related events, such as call arrival, call holds, call queuing events, and call dropped events, are received over network 310 from call manager 131. Data updates related to the call or the caller (customer to be served), are received over network 310 either from an internal IVR 121 or from an external IVR 120 via data interface 143. Typical data collected from an IVR would include customer identification information such as account number, PIN number, and phone number (which may also be obtained from call manager 131); additionally, information about what menu selections or other data entries a customer may have made while "in" the IVR can be received by Rules Engine 320 from an IVR. Events relating to agent activities will typically be received over network 310 by Rules Engine 320 from either presence server 141 or web applications 140, although it is also possible to receive agent-related events directly from agent station 142 when it is allowed to be connected directly to network 310 (one common way this is done is through the use of a Virtual Private Network, or VPN, between agent station 142 and network 310). Agent-related events can include, but are by no means limited to, those mentioned in relation to FIG. 2 (login/logout, ready/not ready, accepted call, on call, after-call work), and other very specific process-related states such as "entered screen 2", "entered COLL_SSN process step", "authenticated by password", "failed authentication", and so on. In principle every keystroke and mouse action taken at Agent Station 142 can be passed to Rules Engine 320 as events, as can each API or web services call made to Web Applications 140. Other types of events which may trigger business rules in Rules Engine 320 include timer events (such as local midnight, 15-minute timers, and the like) and data-related events (for instance, if a given data element changes in one of Recording Storage 150, Local Data Store 151, or Data Management System 152, and indeed any others not shown. Any data source can act as an event source within embodiments of the invention.

While business rules invoked by Rules Engine 320 can be of any type, the type that is relevant to the present invention are those involving security. For example, when appropriate events are passed to Rules Engine 320, a business rule may be invoked which changes the security level desired at Agent Station 142. More specifically, according to an embodiment of the invention, specific event combinations, expressed as business rules, may define a security zone with which a specific set of security rules is associated. Security Manager 321 implements or enforces security rules for various security zones. For example, Security Manager 321 may require an additional level of authentication to be obtained before allowing sensitive data to be sent to an Agent Station 142 when one security zone is in effect for the particular Agent Station 142 (or for a set of Agent Stations 142 of which the particular one is a member). Security Manager 321 is, according to a preferred embodiment, a software process executing on a dedicated network-connected server. However, according to other embodiments the functional elements of Security Manager 321 may be distributed as separate software applications running on more than one network-connected computer, and indeed one or more of the software applications may in some embodiments run as firmware on specializes security devices such as biometrics sensor devices.

Figure 4:
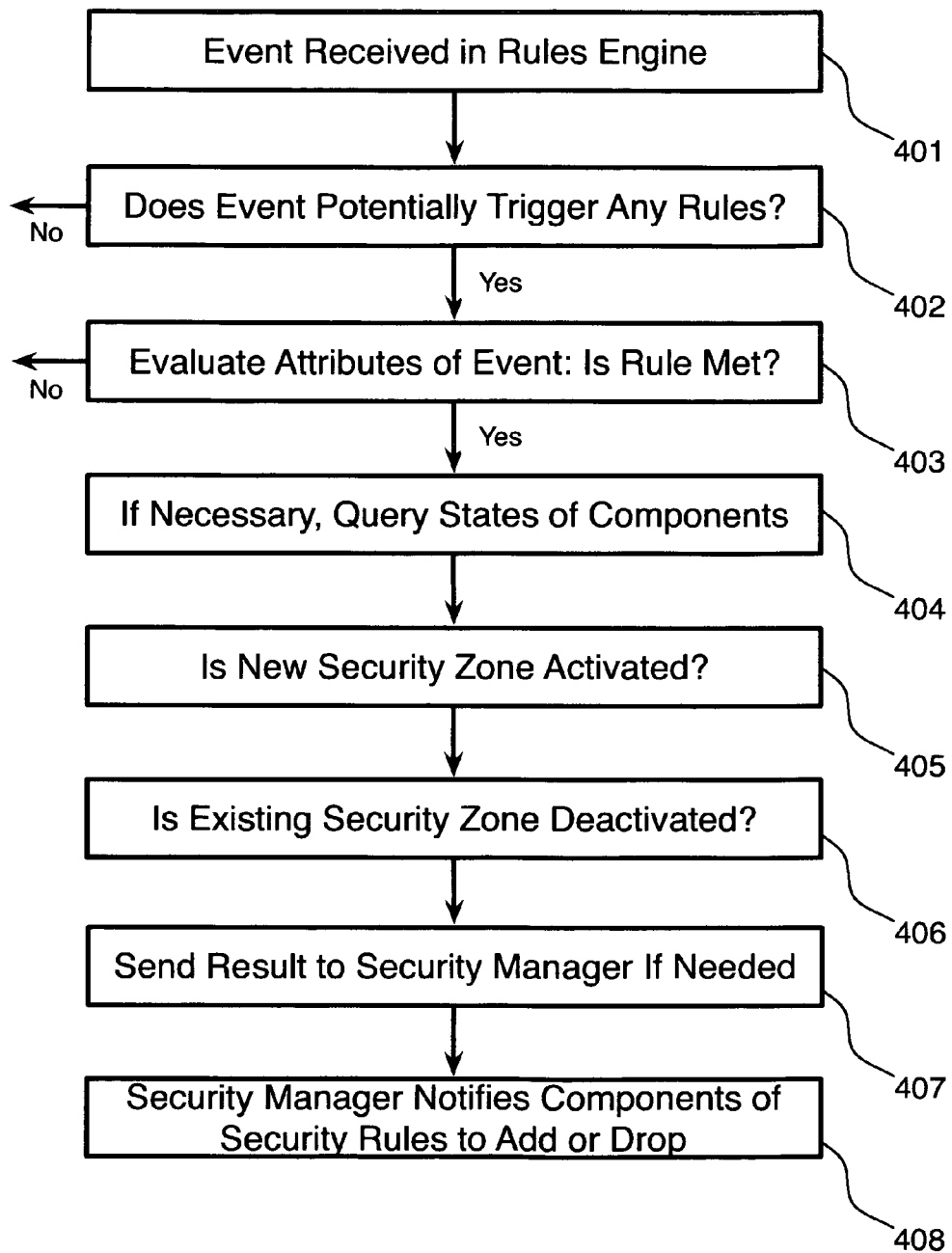
FIG. 4 is a process flow diagram illustrating the adaptive management of security based on agent state changes according to an embodiment of the invention.

FIG. 4 illustrates an exemplary process flow according to an embodiment of the invention by which events are evaluated in Rules Engine 320 to determine if changes to security rules are needed in Security Manager 321. In step 401, an event is received by Rules Engine 320. As mentioned above, the event could come from any of a number of sources. Events typically are datagrams containing information about attributes of the event, such as the source of the event, the time of the event, the type of the event, and any objects of the event (for example, if an event is a call released event at Call Manager 131, the source is the call manager and the object is the unique identifier associated with the particular call that has been released). After the event has been received, it is checked against the rules set associated with Rules Engine 320 (that is, those rules in memory and available at any of the data stores described above), in step 402, to see if the event potentially could trigger any rules. For purposes of illustration, step 402 is separated from checking the attributes of the event in step 403 to illustrate the process in more detail, but the two steps (402 and 403) may be conflated without departing from the scope of the invention. Step 402 basically checks to see if an event of the specific type just received has the potential to trigger any rules, depending on its attributes. If it does, then its attributes are checked against the constraints of the one or more rules that might be triggered to see if, indeed, any of them are satisfied. What has been described to this point is standard rules engine functionality; events are received and evaluated against a list of active rules to see which rules are triggered, and in what order; triggering of rules is itself and event, so a cascade of rules firings can occur following any event. However, many business rules which are desirable in an adaptive security zones architecture are compound rules, such as "when a call arrives from a customer to an agent station where the agent has accepted the call, and the call is from a particular client, and the agent's previous call was from a different client, verify the desktop application from the previous client's Web Application 140 is fully closed before allowing a desktop application from the new client's Web Application 140 to be loaded, to avoid cross-contamination vulnerability between clients' data applications". No one event will ever fire that encapsulates all of these constraints. In one embodiment, either Rules Engine 320 or Security Manager 321 is stateful and maintains a complete state of all relevant objects (in this example, relevant objects would include the Web Applications loaded at each desktop, and the identity of at least the current and most recent calls for each agent station 142. However, stateful applications are often not desirable in a web services oriented architecture, for a number of well-known reasons, and accordingly in another embodiment, illustrated by step 404, any necessary states are gathered by querying the respective components for their current state. For example, if in step 403 it was determined that the complex rule just described was triggered, in step 404 Rules Engine 320 would query the associated Agent Station 142 to determine the identity of the client associated with the most recent call handled there, and the to determine the state of any client Web Applications 140 still loaded at that Agent Station 142. Step 404 is an optional step that is primarily used in situations when complex states must be monitored and one or more stateless components are used. When components are stateful, full state information can be passed to Rules Engine 320 with each event as attributes to the event. Alternatively, Rules Engine 320 can itself be stateful, and when it needs to analyze complex states, step 404 can be executed by querying its own state history. For example, in step 404, and using the previous example scenario, Rules Engine 320 would look in its event history to determine if the last call-related event from a particular Agent Station 142 was "call released" and if the client associated with the call that was released is different then the client associated with the current event being evaluated.

With the complete, potentially complex nature of the event received in step 401 known and any rules identified, in step 405 Rules Engine 320 checks to determine if any rules whose conditions have been satisfied require activation of a new security zone. And in step 406 satisfied rules are checked to determine if any existing security zones require deactivation. Activation of a new zone does not necessarily imply deactivation of come previous zone; each security zone is activated and deactivated independently by triggering of business rules. It should be noted, however, that this does not preclude a single event from deactivating one zone and activating another, each covering the same spatial extent (for example, each applying only to a specific Agent Station 142). But it is entirely feasible for one security zone to require enforcement of one set of security rules within a particular region (as defined above, regions can be both spatial and temporal), and then for a second security zone to be activated that requires some additional set of rules to be enforced. Logically, if some of the previous rules are to be kept but others "turned off", a previous security zone would be deactivated and a new security zone with only the desired rules would simultaneously be activated. It should be clear that many combinations of zones and rules are possible. As the final step in processing an event in Rules Engine 320, any results determined in steps 405 and 406, that is any required activations or deactivations of security zones, are passed via network 310 to Security Manager 321 in step 407.

Security Manager 321 reviews each activation and deactivation request sent (in step 407) and determines which components (meaning elements of the overall architecture, such as network 310, Call Manager 131, Web Applications 140, Agent Station 142, and so forth) are affected. It notifies each affected component, in step 408 of security rules that must be enforced or that should no longer be enforced. As an example of how the process of establishing and managing adaptive security zones can be carried out, Agent Station 142 is equipped with a basic speaker recognition software module such as are known in the art. Because Agent Stations 142 are often used by only one agent, and generally are not used by more than a very small number of agents, it is possible for such a speaker recognition module to have a significant ability to identify the one or very agents who typically use a given Agent Station 142 because of the large data set available to the speaker recognition module. In such situations, it may happen that a speaker recognition module detects the presence of an unknown speaker, either instead of the usual speaker or perhaps in addition to the usual speaker. This could occur, for example, if a family member of a home agent stepped into a room where the home agent was working at Agent Station 142 and began speaking. If so configured, a speaker recognition module, on detecting such an unknown speaker, could fire an event informing Rules Engine 320 of the possible presence of an unknown new (or additional) speaker. Rules Engine 320 would carry out the steps of FIG. 4 and determine that a new security zone should be established on the affected Agent Desktop 142 in which no sensitive customer data would be allowed to be displayed on screen or spoken aloud, and perhaps also in which additional authentication would be required from the know or expected user, and in which a warning would be provided to any user of the affected Agent Station 142 that security needs require that only authorized users see or hear sensitive data (in order to prompt the correct user to ask others to leave). Rules Engine 320 would send the new security zone to Security Manager 321, which would in turn notify Web Applications 140 not to send any sensitive customer data to the affected Agent Desktop 142, and to effect the necessary warnings on Agent Station 142.

Figure 5:
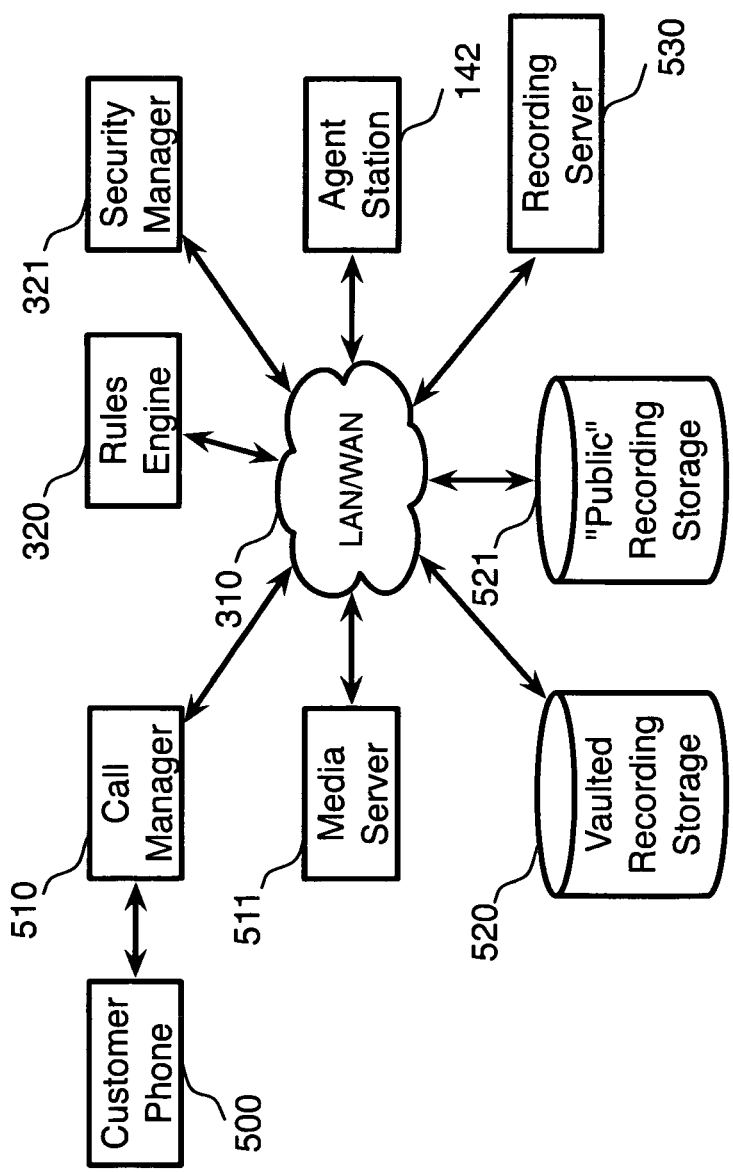
FIG. 5 is a block diagram of an embodiment of the invention comprising a system for recording calls comprising means for deleting sensitive data automatically.

FIG. 5 illustrates an embodiment of the invention in which an adaptive security zone is implemented that prevents sensitive data from being divulged to unauthorized or illegal parties via recordings of calls or call segments. Sensitive data can include consumer privacy data such as credit card numbers, dates of birth, social security numbers, and other private information pertaining to one or more consumers. Such information is typically by provided during customer service sessions in order to enable service delivery. For example, a consumer calling a bank contact center from Customer Phone 500 will typically provide her name, account number, and often a unique identifier such as a PIN or a mother's maiden name, either to an IVR or directly to an agent working at Agent Station 142. Since most contact centers record all or portions of calls with customers, including what is said by a consumer at Customer Phone 500 and what is said by an agent at Agent Station 142, much of this sensitive data will be therefore be recorded. According to a preferred embodiment of the invention, calls are recorded by Recording Server 530, which is connected to the call audio streams typically as a (silent) conference party, by Call Manager 510. Audio may be recorded as one stream with all parties blended together (for example, a consumer and an agent, or perhaps a consumer, an agent, a quality monitor, and a supervisor), or each channel (party) may be recorded separately.

There are various means by which sensitive regions in one or more audio streams may be identified, according to the invention. In the simplest and least automated, a person manually listens to each recording and marks start and stop points for sensitive regions, for example a start point would be when a person begins to recite his social security number, and a stop point would be when the recitation of his social security number is completed. The inventors contemplate several automated means to accomplish detection of start and stop points of sensitive regions. Automated speech recognition (ASR) systems, which are well-known in the art, may be used to detect key words that signal when sensitive data is likely to be uttered. For instance, if a person is detected by ASR to say, "my account number is", an event may be sent to Rules Engine 320 which triggers a rule stipulating that the next ten seconds are to be considered sensitive; alternatively, ASR could refine the definition by listening for digits and marking the time when a first digit utterance starts as a start time, and the when a last digit utterance ends as an end time. Similarly, other common keywords such as "social security", "PIN", and the like may serve as markers within grammars defined within an ASR system to detect sensitive data. Such ASR-based detection can be attempted in real time, as audio is streaming to Recording Server 530 from each call leg, or after an entire call recording has been collected (or indeed after a subset, such as a 30-second segment, has been collected). Because ASR is not perfectly accurate, and because there are many ways in which sensitive data might be provided by a customer (or repeated by an agent) that were not anticipated by those who prepared rules for use by an ASR system (such as grammars), other means are also contemplated for use in detecting the presence of sensitive data.

In one embodiment, normal work flows associated with customer service calls are built using a series of screens shown to an agent at Agent Station 142. For example, one screen might be designed to facilitate the collection, by an agent, of customer identification information. Often it is necessary to collect several distinct forms of identifying information from a customer to satisfy internal or legal rules (for instance, Health Insurance Privacy Assurance Act, or HIPAA, compliance for health-related calls), so such screens could be active for considerable portions of a call's length. Each screen transition constitutes an event that can be sent by Web Applications 140 to Rules Engine 320, where it can trigger a rule that establishes a new security zone with a rule that says "sensitive data: must mask or delete all recorded for the period this zone is in effect before sending recordings to Public Recording Storage; full recordings may still be collected and stored in Vaulted Recording Storage" (of course, these "rules" will in most embodiments be parameter settings rather than English phrases; the plain language rule just provided is for exemplary purposes only), or another which says "non-sensitive data: all recorded data for this zone may be stored in Public Recording Storage". As each of these rules is triggered, Rules Engine sends a corresponding event to Security Manager 321, and Security Manager 321 notifies Recording Server 530 of its new operating parameters. Note that in some embodiments, notification of screen change or other application-level events that trigger deletion or masking of sensitive data is sent directly from Web Applications 140 or Agent Station 142 to Recording Server 530. Also, Recording Server 530 can be a software application executing on the same computer as Web Applications 140, or even on Agent Station 142, as when an agent works "offline" and recordings are captured locally for later transfer to a centralized storage facility, without departing from the scope of the invention. As an agent moves from screen to screen while serving a customer, different security zones are sequentially activated to cause recording, or deletion (or masking) of audio data as required by underlying application or work flow context. Also, embodiments described herein for handling recordings of audio streams or files can also be used to record and to mask or delete sensitive data in video or text streams without departing from the scope of the invention.

In some embodiments, it is desirable to obtain more granular, or finely divided, divisions between sensitive and non-sensitive data. For example, if a particular screen did encompass several sensitive data elements but also many non-sensitive data elements (or if it was active for a much longer period of time than that in which sensitive data was being handled), then much more recorded audio (or video, or text) would be deleted (or masked) than necessary. Accordingly, events can be sent from Agent Station 142 or Web Applications 140 to Rules Engine 320 each time an agent's focus moves into, or out of, a sensitive data element of a screen. For instance, when an agent moves a cursor into a field for entering a customer's social security number, an event is fired to set a sensitive data security zone; and, when the agent leaves that field, another event is fired to set a non-sensitive data security zone.

In another embodiment, entry into and out of sensitive data zones can be signaled by events generated by software executing on Agent Station 142 or by Web Applications 140 executing on an application server, said events being generated when internal application logic requires it (event triggering based on entry into data fields or screen transitions are specific cases of this general approach). Such events could be generated when, for example, an agent presses a particular hot key or clicks a button or other control within a screen-based or browser-based application to indicate that something the agent or a customer is saying at the particular point in time is sensitive.

The sensitivity of information uttered within calls, within video sessions, or within streaming text sessions, does not necessarily be due to consumer privacy. Other examples of sensitive data which may be deleted or masked according to embodiments described herein include data concerning a business that it is unnecessary for a quality monitor or training staff member (or indeed a trainee) to hear or see. For example, price information provided by an agent to a customer, or perhaps discussed by an agent and a supervisor while a customer is on hold, could be masked or deleted to prevent unnecessary or undesirable disclosure of the sensitive pricing data to unintended persons. Also, and especially when home agents are involved, it may be information pertaining to or belonging to an agent that is sensitive and requires masking or deletion. For instance, if an agent is on a call and puts a customer on hold in order to respond to a domestic query verbally, the agent's (and possibly another member of the agent's household's) voice may be recorded automatically (since a customer call is still ongoing). In some embodiments, agents are provided with a "privacy button", which they can activate to prevent any audio from being recorded by Recording Server 530. Programmatic controls, which can be configured by security rules set as part of an adaptive security zone, may disable such privacy buttons, for example whenever a customer is on an active call leg. Additionally, privacy buttons can be deactivated automatically after a configurable delay period to prevent inadvertent or intentional long-term masking of "what is going on" at Agent Station 142 from enterprise 100.

There are various ways of masking or deleting sensitive data that is marked for censorship, according to the invention. In some embodiments, audio is masked by superimposing a loud noise signal on the recorded audio signal, while in other embodiments the audio signal is simply deleted. This can actually be done in two ways. In one embodiment, a null audio signal (silence) is inserted in place of all audio between start and stop markers so that the overall time elapsed by the entire audio file, when censored, corresponds to the actual time. This is particularly useful when screen capture or other logging methods are used to capture application-related events during the customer service session, as it allows correlation of times between audio and other data sources. In another embodiment, the section of an audio recording (stream or file) that is marked as sensitive is simply deleted. Also, marking of start and stop times can be performed by either adding a non-audible audio marker to the audio stream or file (typically, either too high or too low in frequency to be detected), or by storing start and stop times as data elements in Recording Server 530 and then referring to them when editing recorded audio or video.

In all of the discussion above concerning sensitive data in call recordings, it should be noted that not only are recordings of audio from call legs or video from video call legs disclosed, but also recording of any or all other aspects of each interaction session. For example, it is common in the art for screen capture to be used to record screen-based actions taken during a session. It is envisioned by the inventors that, in an embodiment of the invention, sensitive data can be masked or deleted from these screen-captured session recordings based on changes in security zone settings or security-related events in an analogous manner to that described above for call recordings. The same events or triggers can be used to mark start and stop points for sensitive data in screen capture sessions; additionally, in some embodiments specific screen elements such as coordinate regions or specific data fields are specified as well as start and stop times in order that only the sensitive data on a screen is masked, while other, non-sensitive screen-captured data is recorded normally.

Figure 6:
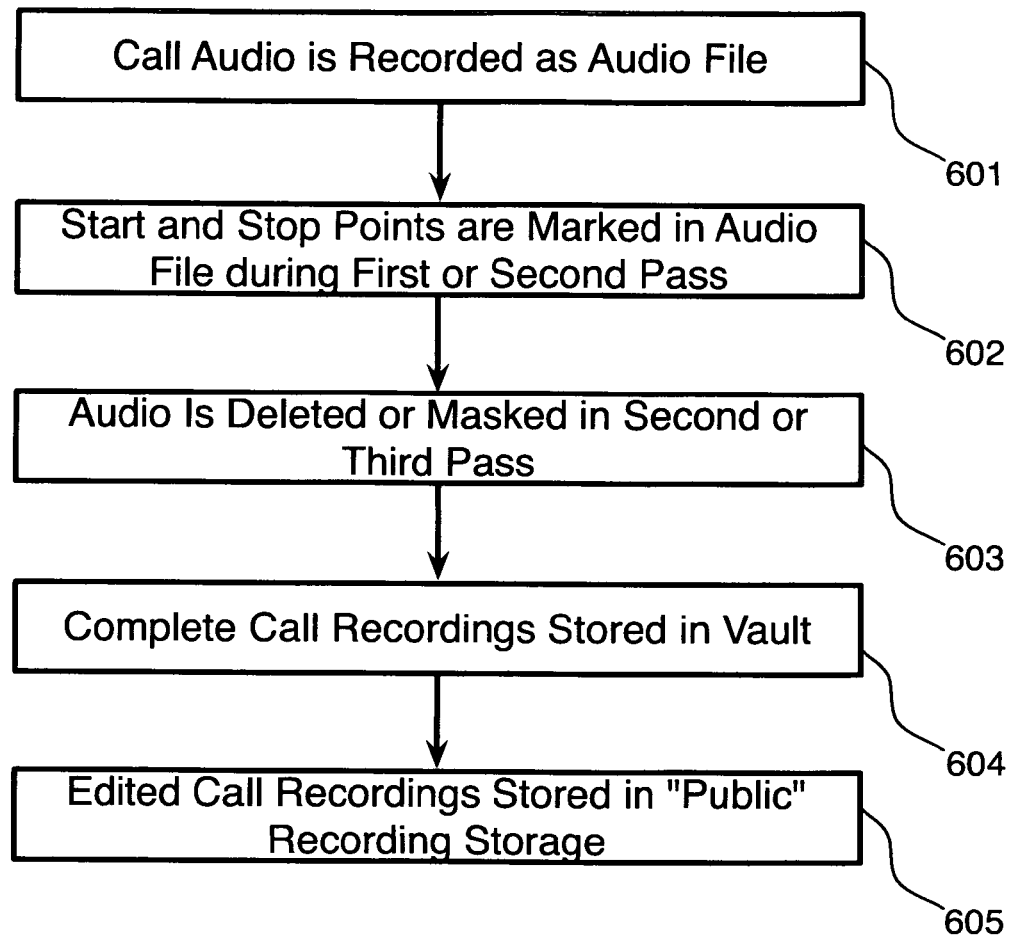
FIG. 6 is a process flow diagram illustrating an embodiment of the invention in which sensitive data is deleted from call recordings.

FIG. 6 illustrates a process, according to a preferred embodiment of the invention, by which sensitive data is protected in recorded audio. In a first step 601, audio is recorded in Recording Server 530 and stored as a data file. Many formats are known in the art for storing audio as data files, including .wav and .mp3; any method may be used according to the invention. Either while the file is being recorded, or in a second "pass" through the data, starting and stopping points of time regions within the audio where sensitive data is or is likely to have been recorded are marked in step 602. In some embodiments, marking is based on metadata associated with an underlying business process or application, for example by marking a region sensitive upon entry into a data-entry process step (or data entry field in an application) for gathering private information such as a social security number about a caller. In step 603, audio is deleted or masked, as described above, within each marked region. This can be done in a separate pass through the data, or concurrently with the marking of the sensitive regions. Alternatively, sensitive regions can be detected and the audio in them masked or deleted immediately without the need for separate passes if desired. In step 604, complete audio (or video) recordings are stored in Vaulted Recording Storage 521, and in step 605 edited audio recordings are stored in Public Recording Storage 520. "Public" here does not mean that anyone has access to it, but is rather a convenient term to differentiate between recordings that are generally available for all users who have authority to listen to recordings of customer interaction and those that are only available for carefully screened and perhaps even only legally required persons. Public recordings typically are used by quality monitors, who could work for enterprise 100, its clients (if enterprise 100 is an outsourcer), or for third party quality monitoring and quality assessment companies, by trainers and trainees, and by supervisors and business analysts. In addition, public recordings could be analyzed using an emerging class of software tools known as speech analytics tools to study customer service processes. Typically, vaulted recordings would only be used in formal proceedings such as legal discovery, verification of regulatory compliance, auditing by outsourcers' clients, employee disciplinary and performance issues, and so forth. Recorded data in public recording storage 521 is commonly made available to users over web interfaces, while complete recorded data stored in vaulted recording storage 520 is usually not available except to a small number of authorized persons operating within, enterprise 100, and furthermore vaulted recording storage 521 accesses are typically logged, in auditing systems so it is always possible to state with certainty who has had access to precisely what recordings.

Figure 7:
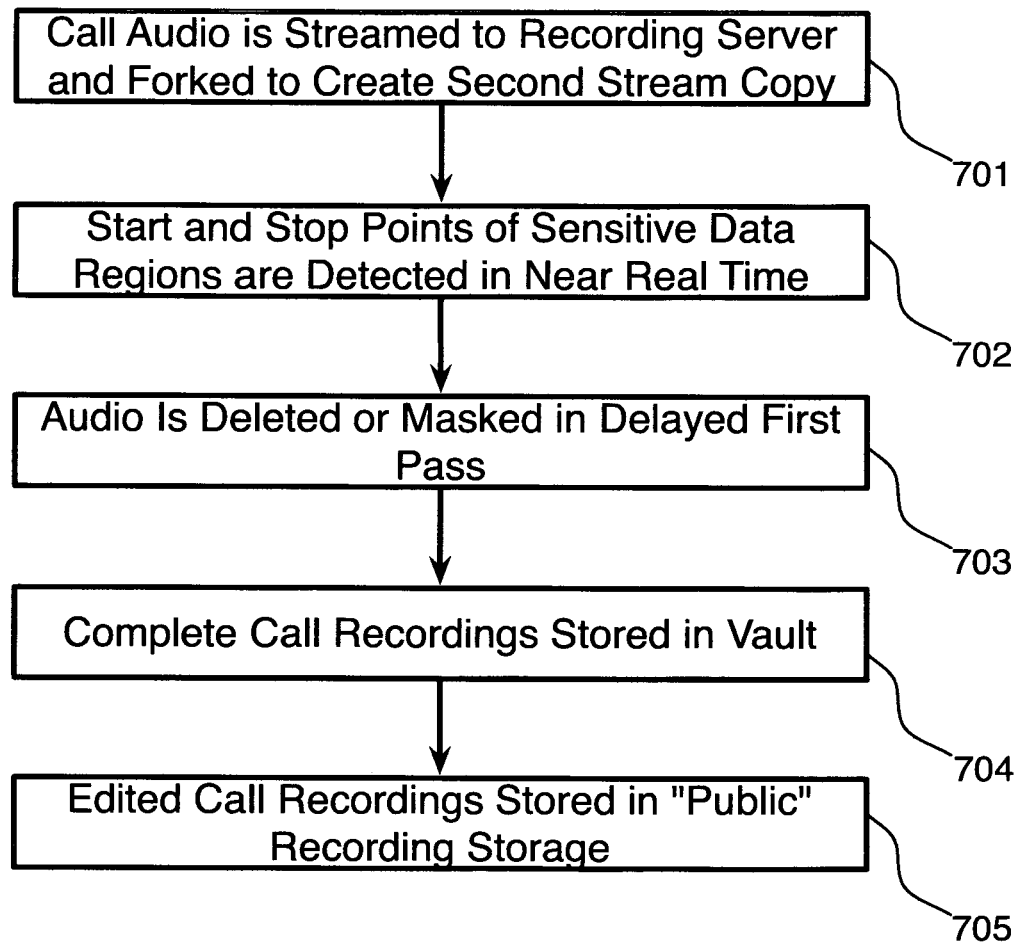
FIG. 7 is a process flow diagram illustrating an embodiment of the invention in which sensitive data is deleted from streamed data.

FIG. 7 illustrates an embodiment of the invention in which protection of sensitive data is provided in real-time or near real-time on streams of audio or video data, potentially while customer calls are still in progress. In step 701 audio or video streams are connected, or streamed, to Recording Server 530. Typically, in stream-based modes, Recording Server 530 will fork a copy of the input stream, perhaps time lagged by some suitable amount of time (typically a few seconds); the second, forked, stream will be edited in real-time or, if time-lagged, in near real-time, and sent to "Public" Recording Storage 521, while the first stream will pass through unedited and be stored in Vaulted Recording Storage 520. Start and stop points of sensitive data regions in streams are detected in real-time, or near real-time, in much the same manner as described above with reference to FIG. 6, in step 702. For example, when an agent moves to a data entry field at Agent Station 142 in order to type a social security number as a customer recites it, and event is sent to Rules Engine 320 where a rule is triggered that sends a new security zone directive to Security Manager 321; Security Manager 321 then sends an event to Recording Server 530 telling it to start masking audio or video data in the second, forked stream. If these events are processed very quickly (or if all of this processing takes place directly on Recording Server 530, which can be done without departing from the scope of the invention), then the forked stream may be edited essentially in real-time, since there is usually at least as much time lag from when an agent enters a field before data is spoken as will be required for event processing, so masking/deletion can start before sensitive data is actually uttered. However, according to some embodiments the forked stream is time-lagged and therefore an amount of time equal at least to the length of the (configurable) time lag is available for event processing while still allowing sensitive data to be fully deleted or masked. Deletion or masking of sensitive data in the forked stream is performed in step 703. Complete call recordings (from the first, unedited stream) are stored in Vaulted Recording Storage 520 in step 704, while edited recordings are stored in Public Recording Storage 521 in step 705.

In some embodiments, automated speech recognition (ASR) techniques are used to transcribe some or all of the recorded calls, exclusive or not of the sensitive regions (if sensitive regions are transcribed, their transcripts would be stored in a vault in the same manner as the full call recordings). Such transcripts would render the contents of calls searchable, but of course such transcripts come at a cost. When dealing with speaker-independent, large-vocabulary speech recognition, the costs of obtaining complete, high-accuracy transcriptions would be very high, and in some embodiments only targeted portions of recorded calls would be transcribed. Targeting is accomplished, in an embodiment of the invention, by triggering rules in Rules Engine 320 based on events (and possibly metadata concerning events) that occurred during the course of calls, such as agent transitions between screens or screen elements of a business software application used during calls.

Figure 8:
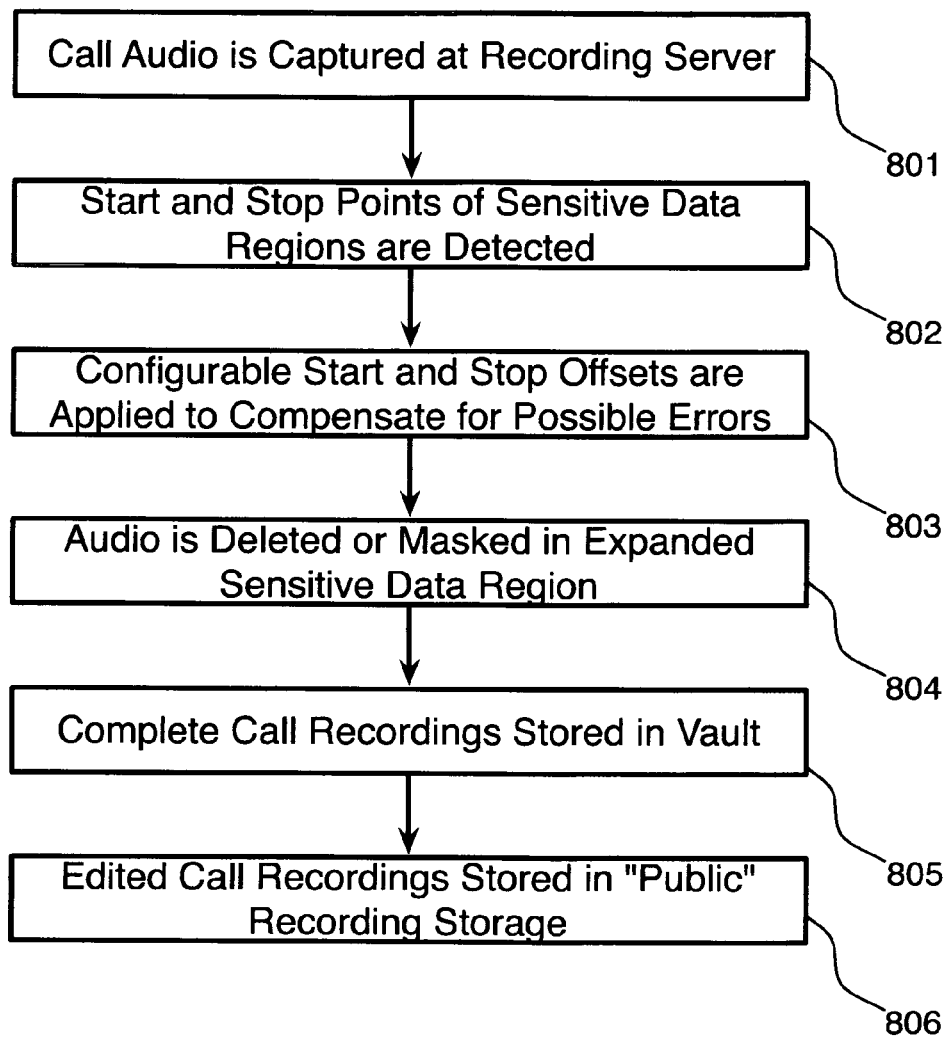
FIG. 8 is a process flow diagram illustrating an embodiment of the invention in which time offsets are used to manage deletion of sensitive data from call recordings.

FIG. 8 illustrates a process, according to an embodiment of the invention, in which time offsets are used to ensure that all sensitive data is deleted or masked. Sometimes, triggering events may not occur until some time after a customer (or other party) begins providing sensitive data, potentially leading to failure to screen (delete or mask) the sensitive data. For instance, an agent might move quickly to a social security number entry field in Agent Station 142*b* after a customer unexpectedly says, "Oh, and my 'sosh' is 999-98-9999 in case you need it". If the triggering event is the entry of a data entry field associated with a sensitive data element, it would not occur in this case until some time after the customer started to recite her social security number. Therefore, after call audio is captured in step 801 (either via stream or as a file) and start and stop points have been detected as described above in step 802, configurable start and stop time offsets are applied in step 803 to the start and stop times and the marks are made at the new, offset times. Typically (but not necessarily), start time offsets will be negative, meaning the actual marked time will be earlier than the detected start time, and the converse will usually be true of stop time offsets (again, not necessarily; negative stop time offsets can be used according to the invention). In steps 804 and 805, call recordings are stored as before.

In many cases, call recordings are used by business users to monitor quality of customer service processes, to resolve contested issues between customers and agents, to aid in training or disciplining of agents, and to monitor quality of service provided by agents who are employees, contractors, or even employees of outsourcers. Call recordings have very significant business value, but as discussed they also represent significant risks in terms of security of confidential business data and the protection of consumer privacy as required by many statutes. While deletion of personally identifying information and other sensitive data in call recordings that will be used by business users is an excellent step, it is still often not sufficient when access to call recordings is obtained over public networks such as the Internet. Accordingly, in some embodiments, information rights management (IRM) technologies are applied to call recordings. IRM technologies known in the art employ a combination of strong encryption, user-based access control, and robust control over the ability of users to copy the information (for instance, by disabling operating systems functions for taking "screen shots", and disabling copy and paste when IRM-controlled data is being used within an application). In some embodiments, IRM is enhanced by checking at the operating system level whether any other applications are "listening" to the output of a user's computer's sound card; if so, re-recording of IRM-controlled call recordings might be possible and accordingly IRM prevents playback of call recordings while any other applications are listening to sound outputs. Such a check can be performed just before a user's computer begins to play a call recording, and could be repeated periodically during playback to ensure that no application begins listening during playback.

Figure 9:
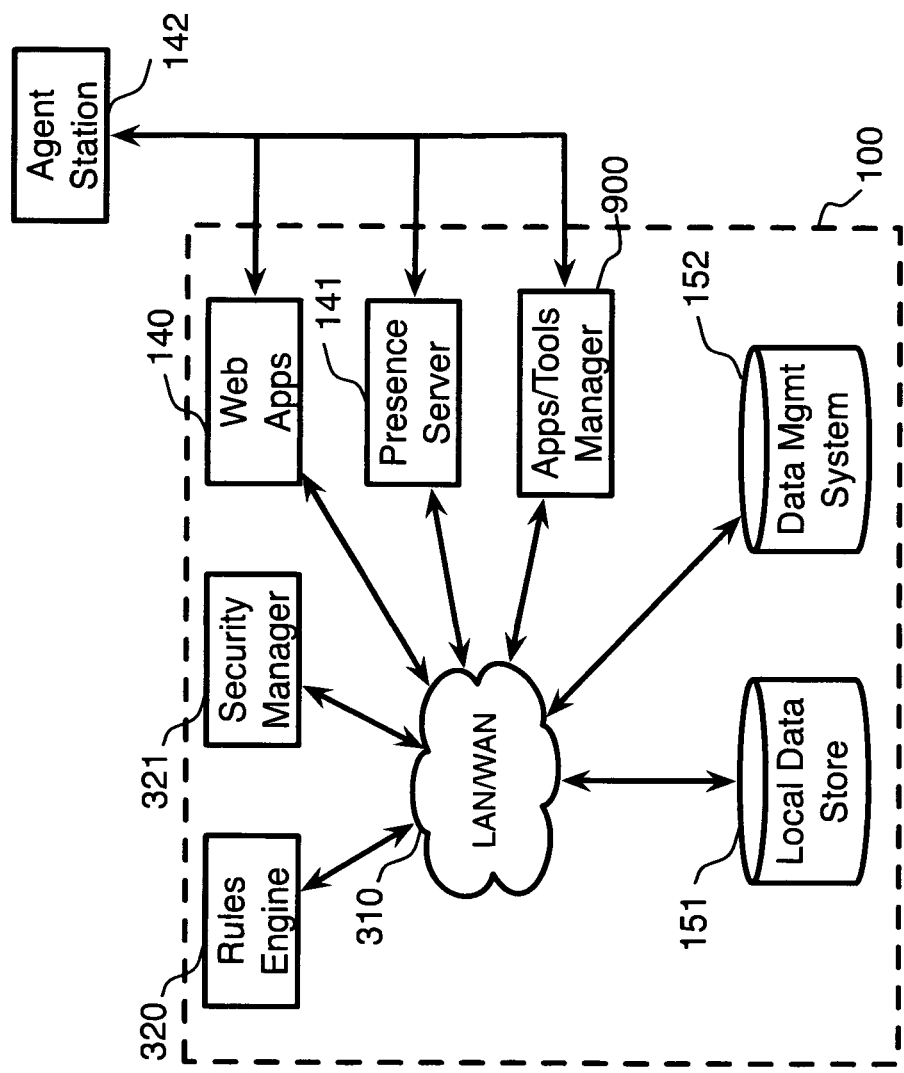
FIG. 9 is a block diagram of a customer service platform according to the invention with a secure agent desktop.

Adaptive security zones are also used, in an embodiment of the invention, to control access to tools or applications by agents at Agent Station 142. In many cases, agents may handle customer service requests from customers of more than one client of enterprise 100, and it is important to protect each client's applications and tools, as well as each client's data, from inadvertently being used by, or exposed to, customers or employees of other clients. For example, if screen recording were used along with call recording to record customer sessions, techniques described above would suffice for identifying and deleting known sensitive data in these recordings. However, if another client's application was still visible on an agent's screen, the information about that application would not typically be available to the managers of customer service for the client whose session is active and being recorded (because it is not their application). As a result, sensitive data about the earlier client's customers, business, and applications could be compromised. In other situations, clients may require that certain applications only be operable when agents at Agent Station 142 are actually engaged in an active customer session, but not when the same agents are idle. Accordingly, in an embodiment of the invention (and referring to FIG. 9), an Applications/Tools Manager 900 is used to effectuate security zone changes signaled over network 310 by Security Manager 321. As an example, when a call is completed, an event signifying that is received by Rules Engine 320, which determines that certain rules are satisfied and sends a security zone notification to Security Manager 321 as described above. Security Manager 321 then implements a security zone by sending a notification to Applications/Tools Manager 900 requiring that certain tools are disabled for the agent who just finished a call; when another call is offered to the same agent, the same process could be used to re-enable the tool so it is available on the next call.

Figure 10:
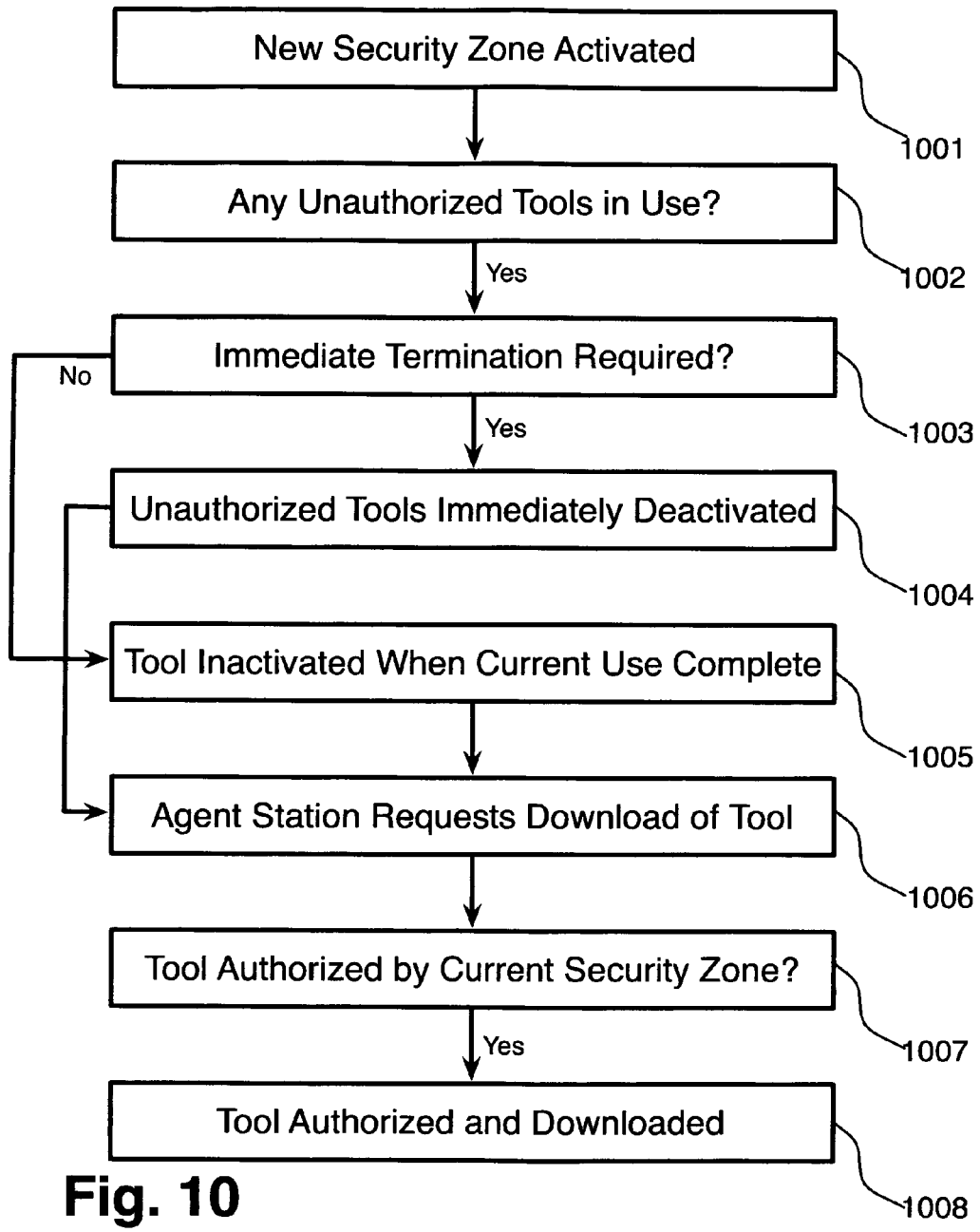
FIG. 10 is a process flow diagram illustrating an embodiment of the invention according to which adaptive management of a secure desktop is implemented.

FIG. 10 illustrates an exemplary process, according to an embodiment of the invention, by which control of tools and applications used by agents at Agent Station 142 can be implemented. In step 1001 a new security zone is activated by Security Manager 321 in response to some event/rule combination handled in Rules Engine 320. In step 1002, Applications/Tools Manager 900 checks if any now unauthorized tools (or applications, or indeed any particular features of applications or tools) are in use on Agent Station 142. If there are unauthorized tools, applications, or features in use, in step 1003 Applications/Tools Manager 900 determines whether immediate termination of use of unauthorized tools, applications, or features is required. If it is, then in step 1004 unauthorized tools, applications, or features requiring immediate termination are immediately deactivated and any use of that tool by an agent at Agent Station 142 becomes disabled. Because sudden disablement in this manner may result in loss of work or data, or incomplete transactions, in many cases it is desirable that unauthorized tools, applications, or features not be deactivated or disabled until the current use is completed (clearly there are various ways in which "current use" and "completed" can be defined, and any of these can be implemented in Applications/Tools Manager 900 according to a particular enterprise's 100 or client's needs). Accordingly, when immediate deactivation is not required in step 1003, tools, applications, or features are deactivated later, in step 1005, when current use is completed. After resolution of any situations created by the enactment of new security zone in step 1001, agents proceed as normally. When a new tool, application, or feature is needed for download from Web Applications 140 or use on Agent Station 142, Agent Station requests download of the tool, application, or feature in step 1006. Applications/Tools Manager 900, on receipt of such a request, determines whether the requested tool is authorized in the current security zone in step 1007 and, if so, authorizes the tool, application, or feature and allows Agent Station to download it in step 1008.

Figure 11:
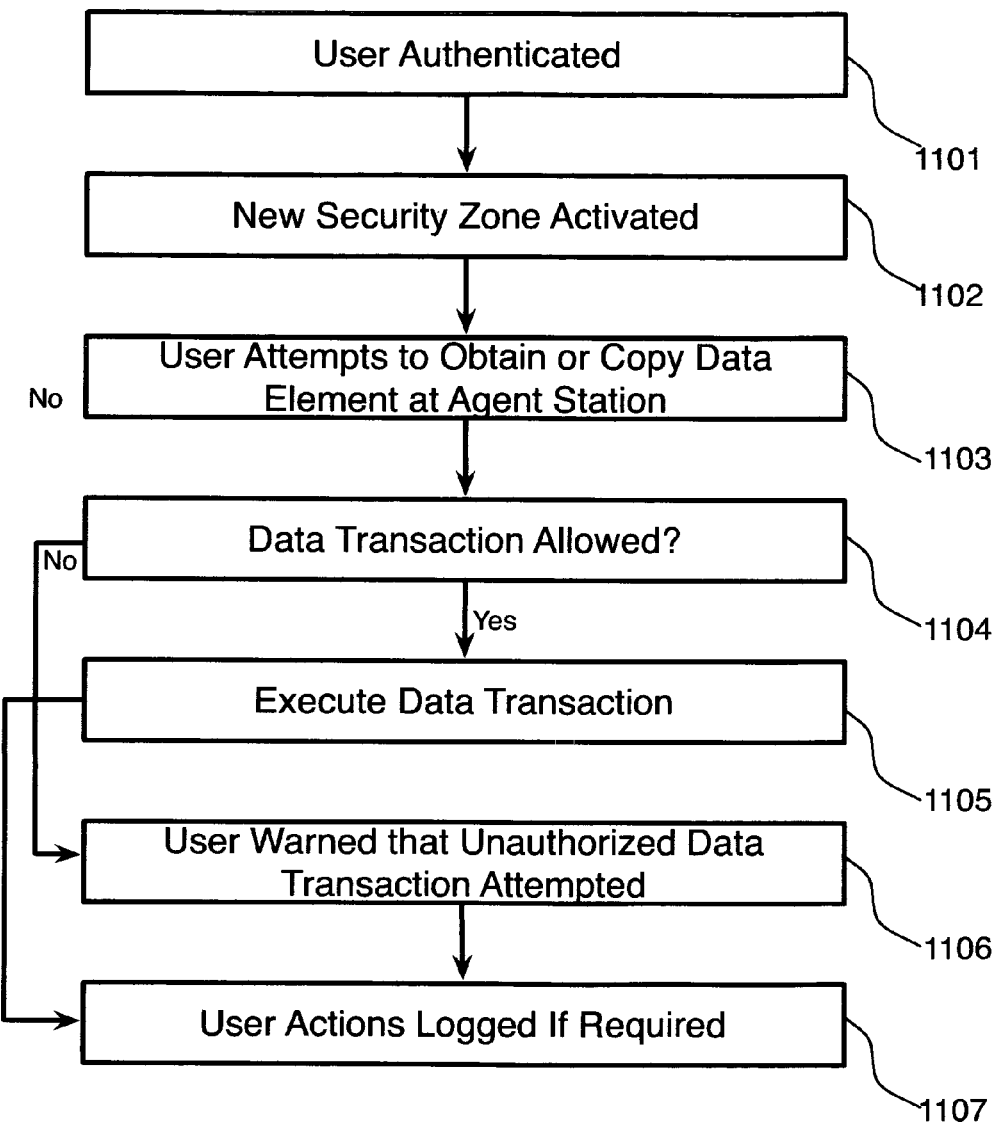
FIG. 11 is a process flow diagram illustrating an embodiment of the invention according to which data access by an agent is adaptively managed.

In another example of adaptive security zones according to an embodiment of the invention, FIG. 11 illustrates a process for managing data access according to adaptive security zone settings. In step 1101, a user is authenticated at Agent Station 142 normally. At some later time, in step 1102, a new security zone is activated, in response to some event handled by a business rule implemented in Rules Engine 320, that is applicable to Agent Station 142 where the user is located. When the user, in step 1103, attempts to obtain or copy one or more data elements at Agent Station 142, a check is made (step 1104) to determine whether the authenticated user is authorized to access or copy the requested data. Notice that both data access and data copying may be managed according to this embodiment; as it is important to prevent unauthorized copying by people who are in fact authorized to access a certain one or more data elements, control of access and copying may be executed using one process but different permissions. If the requested data transaction is allowed, it is carried out in step 1105; if not, the user is warned in step 1106 that he attempted to carry out an unauthorized data transaction. And in step 1107, any logging or audit requirements are carried out.

Figure 12:
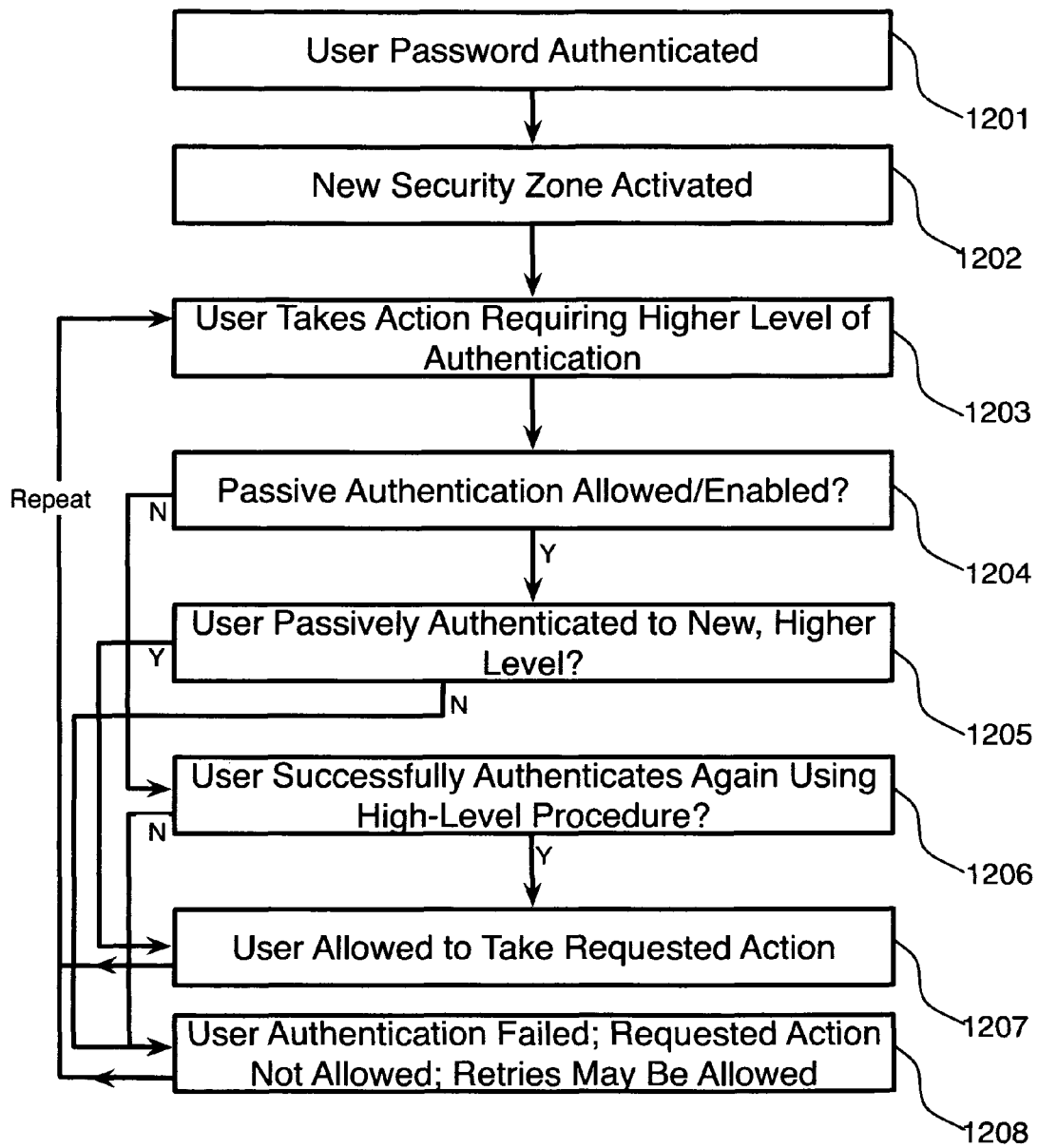
FIG. 12 is a process flow diagram illustrating an embodiment of the invention according to which adaptive authentication strategies are implemented.

FIG. 12 illustrates yet another embodiment of the invention, in which different levels and types of authentication are used in various security zones. In a first step 1201, a user is normally authenticated using a user name and password as is well known in the art. At some later point, Security Manager 321 activates a new adaptive security zone in step 1202. When, in step 1203, the user takes an action that requires a higher level of authentication than is currently in place for that user, a check is made in step 1204 as to whether passive authentication is allowed and enabled for that user. Note that rules for determining what actions require higher, or more recent, authentications can be passed as parameters of the new security zone by Security Manager 321 in step 1202, or they can be implemented in application logic in Agent Station 142 or Web Applications 140, said application logic being parameterized by data passed as part of the new security zone in step 1202. Passive authentication refers to means used to further authenticate or validate the identity of a user that are done without the user's knowledge. In some cases this may be important as a matter of policy, since it may be desirable for persons about to commit fraud not to be aware that they are being checked, for example. If passive authentication is allowed, it is attempted in step 1205; if successful, the user is allowed to take the requested action (step 1207). If passive authentication is not authorized, then in step 1206 the user is requested or directed to attempt a higher-level authentication (for instance, by using a biometric device or answering a secret question); if successful, the user is allowed to take the requested action (step 4207). In either case (passive or active authentication to higher level), if the attempt fails, in step 1208 the requested action is not allowed. Depending on policies set by Security Manager 321 for a particular security zone, retries at authentication may be allowed. In any case, whether or not the user is allowed to carry out the particular requested action, the process returns to step 1203 the next time the user attempts to take an action requiring a higher level of authentication.

It should be noted that the term "higher level of authentication" can, in various embodiments of the invention, mean different things. In some cases, higher level means "to a higher level of confidence" by adding more authentication factors to an already accomplished authentication; in others, what is accomplished may be more a re-validation of an authentication to restore confidence to the level it was when the authentication was last completed. An authentications may be considered to "go stale" if it occurred too far in the past, or if there have been long periods of inactivity in the time since it was executed, or if some other indication of possible intrusion, or of a user switch, is received. Rules for determining when authentications are required are typical of the type of security rules that are activated in an adaptive security zone.

In some embodiments of the invention, multifactor authentication strategies are used that include passive, behavioral authentication. This approach is based on the fact that different people use computers, peripherals, and software applications in slightly different ways. For example, a particular agent may always use the "tab" key on a computer keyboard to move between certain data entry fields, and yet routinely use a mouse to access other fields. And users may routinely position their mouse in certain screen locations when idle, or they may have a characteristic mouse movement pattern that occurs during periods of reading. Each of these characteristics may be utterly devoid of functional meaning, and may represent simply habits of a user, of which the user may be completely unaware. As long as these traits are relatively stable, at least within a session, they can be used passively to detect situations where the probability is that a user change has taken place. For instance, if a pattern of keyboard and mouse usage suddenly changes, it could be because a different person is now using the mouse and keyboard (or, it could simply be because the same user has shifted from one habitual "loiter state" to another). Positive identification may sometimes be possible where very distinct patterns are present, but even an ability to detect a probable user change can be used, according to the invention, to trigger an active authentication step. Over time, the system of the invention can adapt by noting (for example) that a particular, sudden shift from one behavior pattern to another always results in a successful login verification when checked, indicating a common pattern of behavioral shifts on the part of the particular user; in future sessions, such a common pattern of behavioral shifts can be used as part of the passive behavioral profile for the user. Another example of passive behaviors that can be monitored to validate users or to detect user changes include voice-based user recognition. While it is well-known in the art to have users train speaker recognition systems by speaking particular phrases and then later to repeat those phrases to authenticate themselves, it is also useful according to the instant invention to passively monitor the speech of users and to detect changes in speech patterns which, like changes in keyboard and mouse patterns, can be used to prompt active authentication. In an embodiment, speech is sampled heavily during periods immediately following high confidence authentication events (as when a user actively authenticates possibly using multifactor authentication), to build a "current speech patterns model" for the user (this is done using acoustic feature extraction techniques that are well-established in the field of computer speech recognition). There are two advantages to this approach. First, the confidence level that the speech samples being obtained are indeed those of the expected user is high because the user has just completed a strong authentication event. Second, it is quite common for strong authentication events to be triggered at specific points in a business process, for just before taking a binding order, and this fact can be used to select a very specific recognition grammar to improve the accuracy of word recognition (and therefore to improve the utility of the speech sample for voice recognition in the future). Then, as time progresses, samples switch from being "model-building" samples to being passive authentication data samples, with the speech being sampled being compared to similar utterances made during the model-building phase. Another common area of behavior that is well-suited for passive multifactor authentication purposes is the rate at which typing and other errors are made by a user. These error rates, and the specific types of errors made, will vary over time but will nevertheless tend to be very specific to individual users. As with speech in the example above, sampling can be performed shortly after a strong authentication event and then continued, with the goal of detecting abrupt shifts in error rates and kinds, possibly indicating a change in user (and therefore triggering either more intense scrutiny using passive multifactor behavioral authentication or an active authentication step). Yet another very useful passive user authentication technique is analysis of keystroke rhythm, which tends to be very user-specific. It should be appreciated that there are many possible behavior patterns that can be used to characterize individuals. Some will be stable over long time periods (such as biometric readings), while others will vary in fairly predictable ways depending on fatigue, stress, task complexity, attention span, and other factors. The use of a variety of such indicators, with attention given to sudden changes, and with adaptive learning in place so that over time a full model of a given user's range of patterns (that is, how the user's patterns vary under all conditions normally encountered) can be built up, enables a security management system according to the invention to quite reliably detect change of users (and possibly even change of user attitude from "normal" to "suspicious") without a user having to participate actively or even without a user being aware that it is happening. It should be noted that passive multifactor authentication can be used not only for agents but also for customers or other calling or called parties. For example, it is a statutory requirement that certain kinds of information concerning financial or healthcare matters (or indeed concerning any private, individually identifying information) cannot be discussed with any but the relevant parties, and that appropriate measures should be taken to ensure that this is adhered to. In some cases, a caller might be identified by having them provide their name, social security number, address and possibly a personal identification number. But if a call session is long, it is possible that this user could inadvertently allow another to join or take over the call (for example, if the original caller leaves the phone while the call is active to retrieve a required document). It may be crucial to detect when this occurs and to reauthenticate the caller when doubt arises; detection can occur using passive means as just described.

In some embodiments of the invention, passive authentication techniques are extended to include passive behavioral analysis, as for example in the detection just mentioned of a shift from normal behavior patterns to a behavior pattern that may be characterized as suspicious or secretive. One form of passive behavioral monitoring that can be used according to the invention in layered speech analysis for fraud detection, detection of user confusion (which may lead to a prompt to a supervisor or coach to check on the user), or detection of user fatigue (detection of fatigue can assist in identifying optimal work patterns to maintain high productivity over longer periods of time by identifying particularly effective break patterns). Layered speech analysis refers to a technique of using analysis of a user's speech at multiple levels, or layers. Examples of layers of information present in typical speech signals include the dynamic range of a speech signal and its variability (for example, sudden and large shifts in dynamic range could indicate stress, while low dynamic range could indicate fatigue), spectral content of a speech signal, particularly where the spectrum of sound when particular words are spoken changes significantly, which could variously indicate fatigue, anger, delight, or a change in users), word choices made, length of pauses, and the like. Additionally, similar passive analysis can be applied to the second party to a phone call (or more, if it is a conference call), for instance to detect stress in a customer's voice during a service call. In some embodiments, comparison of layered speech analysis results with other data and metadata may be useful in detecting common patterns of behavior (for example, it might be determined that certain words are common "buy signals" for certain sets of callers, but perhaps not for others). In some embodiments, layered speech analysis is used to trigger rules that may for example provide prompts to an agent to offer a particular product, to start (or stop) recording a call, or to seek help from a supervisor or coach.

Real-time or near-real-time layered speech analysis can be combined with results of offline voice data mining. For example, a study of a large set of sales calls received in response to a particular television offer could lead to a determination that certain speech attributes (accent, stress levels, word selection, and the like) provide strong buying signals. This information can be used during a call as input to layered speech analysis so that these speech attributes will be detected during future calls while calls are still in progress, allowing agents for example to receive notifications that they should attempt to close a sale at a particular time. Similarly, study of speech attributes during recorded calls that were later determined to be fraudulent in nature could determine that certain speech attributes should be considered as fraud warning signs, and could trigger appropriate security responses in the future.

In some embodiments, security zones may include the requirement of an additional person on a call or other session. For example, if a rule is triggered that suggests that possibly an agent is exceeding his authority, or that a caller is berating an agent, the rule might require that a supervisor be summoned to join the call (with or without the knowledge of the caller or the agent). Similarly, if passive monitoring suggests that a caller is becoming annoyed, or that an agent is having difficulty explaining something, it may be desirable to automatically summon a supervisor. When agents are operating remotely from an enterprise, whether at home, at an outsourcer, or in a satellite office, it is often impossible to have a qualified supervisor from the enterprise assist an agent in person. But according to an embodiment of the invention, when such rules are triggered, a virtual contact center supervisor may be summoned. A virtual supervisor could be a person located remotely from the agent in need of supervision, or it could be an automated system designed to record and monitor the interaction and to provide suggestions to the supervised user. When virtual contact center supervisors are "summoned", they are typically provided with access to the audio of the session and to a live view of everything that is happening on the agent's screen. In some cases, even a customer's screen is made available, as is common in technical support contact centers.

All of the embodiments described herein are exemplary in nature and should not be taken to limit the scope of the invention, as claimed.

What is claimed is:

1. A security server for managing adaptive security zones in complex business operations, comprising:
    a server computer including a computer memory, the computer memory being configured to include a security manager module executable on the server computer, the security manager module being coupled to a rules engine, via a data network, adapted to receive events from a plurality of sources, and the security manager module being configured to:
    (a) receive a notification from the rules engine regarding an event triggering a security rule;
    (b) automatically establish a new security zone based at least in part on the contents of the notification, said new security zone extending to at least one remote independent agent of handling calls from customers seeking products or services from a contact center of an enterprise, wherein the at least one remote independent agent works at an agent station that is outside of boundaries of the enterprise;
    (c) determine one or more components and the at least one remote independent agent affected by the new security zone; and
    (d) notify each affected component and the at least one remote independent agent of one or more security rules to be enforced by on the component to facilitate the establishment of the new security zone.

2. The system of claim 1, in which at least one of the event sources is a communications system or device.

3. The system of claim 1, in which at least one of the event sources is a call manager.

4. The system of claim 1, in which the security zone precludes the use of at least one software tool or program that is otherwise available to the remote independent agent.

5. The system of claim 1, in which the security zone requires at least an additional authentication step before the remote independent agent is allowed to take a specific action.

6. The system of claim 1, in which the security zone causes sensitive information to be automatically made inaccessible within a call recording.

7. A system for managing adaptive security zones in customer service operations involving remote independent customer service agents, comprising:
    a call manager server adapted at least to receive and control telephony sessions;
    a rules engine adapted to receive events from at least the call manager server; and
    a security manager coupled to the rules engine via a data network, the security manager being configured to:
    (a) receive a notification from the rules engine regarding an event triggering a security rule;
    (b) automatically establish a new security zone based at least in part on the contents of the notification, said new security zone extending to at least one remote independent agent of a contact center handling calls from customers seeking products or services from a contact center of an enterprise, wherein the at least one remote independent agent works at an agent station that is outside of boundaries of the enterprise;
    (e) determine one or more components and the at least one remote independent agent affected by the new security zone; and
    (d) notify each affected component and the at least one remote independent agent of one or more security rules to be enforced by the component to facilitate the establishment of the new security zone.

8. A computer implemented method for adaptively managing security zones in complex business operations, comprising the steps of:
    (a) receiving an event pertaining to a business operation;
    (b) determining if any rules are triggered by the received event;
    (c) determining if any triggered rules pertain to security;

(d) establishing a new security zone based at least in part on the identity and contents of a triggered security-related rule, said new security zone extending to at least one remote independent agent of a contact center handling calls from customers seeking products or services from a contact center of an enterprise, wherein the at least one remote independent agent works at an agent station that is outside of boundaries of the enterprise;

(e) determining one or more components and the at least one remote independent agent affected by the new security zone; and (f) notifying each affected component and the at least one remote independent agent of one or more security rules to be enforced by the component to facilitate the establishment of the new security zone.

9. The method of claim 8, in which the complex business operation is a customer service operation.

10. The method of claim 8, in which the event is generated by a communications server or device.

11. The method of claim 9, in which the event is generated by a call manager.

12. The method of claim 8, in which the security zone precludes the use of at least one software tool or program that is otherwise available to the remote independent agent.

13. The method of claim 8, in which the security zone requires at least an additional authentication step before the remote independent agent is allowed to take a specific action.

14. The method of claim 8, in which the security zone causes sensitive information to be automatically made inaccessible within a call recording.

15. The system of claim 1, wherein the at least one remote independent agent is an agent working from home.

16. The system of claim 1, wherein the at least one remote independent agent is an employee of an outsourcer that provides contact center services on behalf of the enterprise.

* * * * *